US008722390B2

(12) United States Patent  
Aramayo et al.

(10) Patent No.: US 8,722,390 B2
(45) Date of Patent: May 13, 2014

(54) METHOD AND APPARATUS TO REDUCE THE CARBON DIOXIDE CONTENT IN THE EARTH'S ATMOSPHERE

(76) Inventors: Alberto Aramayo, Coconut Creek, FL (US); Patricia Aramayo, Coconut Creek, FL (US)

(*) Notice: Subject to any disclaimer, the term of this patent is extended or adjusted under 35 U.S.C. 154(b) by 58 days.

(21) Appl. No.: 13/417,247

(22) Filed: Mar. 11, 2012

(65) Prior Publication Data

US 2013/0236950 A1    Sep. 12, 2013

(51) Int. Cl.
*C05D 9/02* (2006.01)
*A01G 33/00* (2006.01)

(52) U.S. Cl.
USPC .............................................. 435/262; 47/1.4

(58) Field of Classification Search
CPC .......... C05D 9/02; A01G 33/00; Y02C 10/00; Y02C 10/02
See application file for complete search history.

(56) References Cited

U.S. PATENT DOCUMENTS

| 3,753,675 | A | 8/1973 | Young |
| 5,535,701 | A | 7/1996 | Markels |
| 5,967,087 | A | 10/1999 | Markels |
| 6,056,919 | A | 5/2000 | Markels |
| 6,200,530 | B1 | 3/2001 | Markels |
| 6,408,792 | B1 | 6/2002 | Markels, Jr. |
| 6,440,367 | B2 | 8/2002 | Markels |
| 6,729,063 | B1 | 5/2004 | Markels |
| 7,479,167 | B2 | 1/2009 | Markels |
| 2009/0118859 | A1 | 5/2009 | Whaley |
| 2009/0119025 | A1* | 5/2009 | Whaley et al. ................ 702/23 |

FOREIGN PATENT DOCUMENTS

WO    WO 2008103675 A1 *  8/2008

OTHER PUBLICATIONS

Key to Metals "Galvanic Corrosion" available at www.keytometals.com/Articles/Art160.htm, web capture indicating webpage available since Mar. 2003 provided.*
Labspace "2.4 Corrosion Processes: galvanic corrosion" available at labspace.open.ac.uk/mod/resource/view.php?id=482931 web capture indicating that the page was available since Nov. 2007 provided.*
West Marine Selecting a Marine Storage Battery, available at www.westmarine.com/webapp/wcs/stores/servlet/WestAdvisorView?langId=-1&storeId=11151&page=Selecting-a-Marine-Storage-Battery, web capture indicating that the page was available since Oct. 2006 included.*
"Chemistry an Experimental Science", (Bodner and Pardue, Chapter 19, "19.18 Galvanic Corrosion and Cathodic Protection" pp. 784-786, Figure 19.12, and 19.13, John Wiley & Sons New York, 1989.*
"Pourbaix diagram (stability diagram)" obtained from www.uobabylon.edu.iq/eprints/publication_12_18276_228.pdf on Jan. 22, 2014.*
Phytoplancton Community Response to a Manipulation of Bioavailable Iron in HNLC Waters of the Subtropical Pacific Ocean, Eldrige et al., Aquatic Microbal Ecology, 2004.
Geo Engineering in the Southern Ocean, John Paull, Elementals, 2009.
Methods Developments for an Unenclosed Mesoscale Iron Enrichment, Coale, 1994.
Biological Response to Iron Fertilization in the Eastern Equatorial Pacific (IRONEX II). I. Microplankton Communty Abundances and Biomass, Landry et al., 2000.
A Mesoscale Phytoplankton Bloom in the Polar Southern is Ocean Stimulated By Iron Fertilization; Boid et al., 2000.
Biological Response to Iron Fertilization in the Eastern Equatorial Pacific (Ironex II). II. Microplankton Community Abundances and Biomass. Landry et al., 2000.
Feasibility of Ocean Fertilization and its Impact on Future Atmospheric Carbon Dioxide Levels, Geophysical Research Letter, Zeebe, 2005.
Model Simulations of Carbon Sequestration in the North West Pacific by Patch Ferilization, Journal of Oceanography, Maisumoto, 2006.
Ocean Fertilization, Oceanography, Strong et al., 2009.
Sequestration of CO2 by Ocean Fertilization, Michael Markels, NETL Conference, 2001.

* cited by examiner

*Primary Examiner* — Jon P Weber
*Assistant Examiner* — Charles Zoltan Constantine
(74) *Attorney, Agent, or Firm* — KB Patents; Luca D'Ottone

(57) ABSTRACT

The object of the present invention is an atmospheric bioremediation system focused to reduce the Carbon Dioxide content in the Earth's atmosphere. The disclosed system includes an apparatus to distribute iron in low oxidation states such as zero or plus two trough out the photic region of high nutrients low clorophylls (HNLC) oceans over a period of time. This special apparatus is needed to provide a slow and continuous release of the iron to prevent premature precipitation. It has been shown that microalgae growth is usually initiated by the addition of iron and its sustained feed in water whose only limiting nutrient to prevent algal growth is iron itself. It has also been shown that southern oceans are a possible large batch area where iron is the limiting nutrient.

2 Claims, 3 Drawing Sheets

METHOD AND APPARATUS TO REDUCE THE CARBON DIOXIDE CONTENT IN THE EARTH'S ATMOSPHERE

REFERENCE TO RELATED APPLICATIONS

The present application claims priority from U.S. Provisional Application No. 61/449,669 to Patricia and Alberto Aramayo directed to: METHOD AND APPARATUS TO REDUCE THE CARBON DIOXIDE CONTENT IN THE EARTH'S ATMOSPHERE filed with the USPTO on Mar. 5, 2011 that is hereby incorporated by reference.

BACKGROUND OF THE INVENTION

1. Field of the Invention

This invention generally relates to methods to reduce carbon dioxide in the Earth's atmosphere, and more in particular to methods to reduce carbon dioxide in the water based on the fertilization of Oceanic waters with ferrous Iron. In the present application Iron (II), Ferrous Iron, and Bioavailable Iron will be used interchengeably as it is generally accepted that due to its solubility Iron (II) is the form of iron predominantly available to biological organisms.

2. Brief Description of the Prior Art

Massive burning of fossil fuels initiated with the industrial revolution lead to an increased production of carbon dioxide freely introduced in the Earth's atmosphere from different sources such as factories, power plants, gas burners, car exhausts and the like. This phenomenon, commonly known as the "greenhouse effect," has lead to a more generalized effect known as global warming, now recognized as a real and significant threat to the earth and its inhabitants.

Several different methods have been proposed to reduce the atmosphere's carbon dioxide content, such methods include mechanical processes such as freezing carbon dioxide into dry ice bars and storing it in the ocean beds, and biogenic processes such as an increase photosynthetic activity of the Northern forests.

Due to the large extent of the resources needed to develop and carry on operations that could affect the Carbon Dioxide balance in the atmosphere with traditional techniques most of these methods that are already present in the literature have now been abandoned or discontinued.

Ocean micro-algae (phytoplankton) are known to consume massive amounts of carbon dioxide and emit massive amounts of oxygen during metabolic photosynthesis, via chlorophyll. It has been demonstrated by different scientific experiments that Iron is the limiting nutrient for algal developments in those oceanic waters featuring low productivity but a relatively high concentration of nutrients.

Different methods have been suggested in the prior art to add iron to seawater in order to promote photosynthetic activity in the photic region. These methods have been described and published by various authors including the American engineer Michael Markels, and the ones whose the inventors have knowledge have been listed in the attached Information Disclosure Statement (IDS).

Despite all the efforts listed above prior art patents describe structures that are either not truly efficient or else involve complicated, expensive, and overly difficult assembly and/or disassembly parts and procedures. In the specific the step that limits most of the methods disclosed in the prior art to reduce atmospheric Carbon Dioxide via an increase of the phytoplankton is the ability to provide bioavailable iron.

Iron has been recognized as a limiting nutrient in some oceanic regions designated as High Nutrients Low Chlorophyll (HNLC) regions. Most of the prior art methods disclose listed in the body of this application disclose ways of fertilizing these regions but fail to address the issue of providing bioavailable iron over a long period of time. Other devices have been advertised on various media but never patented or described into a printed publication.

The present invention is concerned with the removal of carbon dioxide, over a period of several or more years. This involves the deployment of a large scale fertilizer apparatus over defined ocean surfaces distributing iron in order to stimulate the growth of micro-algae that in turn would consume billions of tons of carbon dioxide.

The net effect of this process is to remove the Carbon Dioxide from the earth's Atmosphere and store it in the Ocean waters.

The method and apparatus of the present invention, then, is vastly preferred over the prior art as to a means of removing Carbon Dioxide from the Earth's Atmosphere without employing a large amount of equipment and resources. It is efficient, effective and does not require the intensive use of expensive ships fitted with specialized equipment, or the dumping at sea of dangerous chemicals.

From a macro-biological standpoint, the resultant increase in marine life from the massive algae growth may increase overall marine productivity as proposed in different U.S. Patent Documents.

SUMMARY OF THE INVENTION

The object of the present invention is an apparatus to distribute iron in its bioavailable form through ocean waters. It is a further object of the present invention to distribute iron through ocean waters without dumping any chemicals or altering the waters pH or temperature, or chemical composition.

It is a further objective of the present invention to provide an apparatus that can distribute iron in its bioavailable form through out ocean waters in a fashion that is stable and continuative with time.

It is a further objective of the present invention a process to fertilize seawater by providing a stable source of soluble iron in its low oxidation states over an extended period of time.

It is one of the object of the present invention a method to effectively fertilize those oceanic waters that are high in nutrients but low in chlorophylls activity due to the lack of soluble bioavailable iron.

It is another objective of the present invention to increase oceanic productivity of micro algae, and in turn to increase the photosynthetic process in the photic zone.

It is the ultimate objective of the present invention to provide a method and apparatus to remove carbon dioxide (a greenhouse gas) from the Earth's atmosphere and store it into the world of oceans.

DETAILED DESCRIPTION OF THE INVENTION

Figure 1:
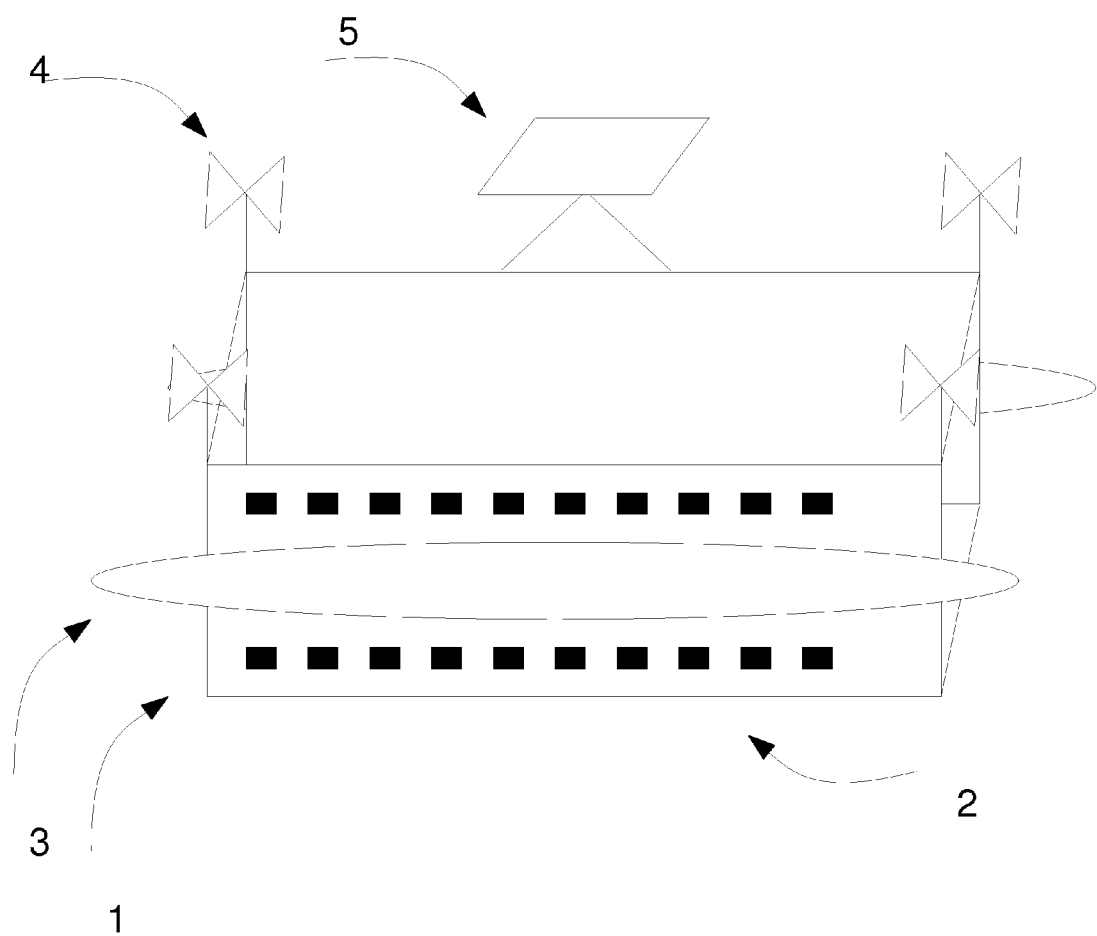
FIG. 1 is a perspective side lateral view of the device disclosed in the present invention to distribute iron in its bioavailable form in the HNLC waters.

In order to achieve the above mentioned objectives the present invention provides an apparatus constituted by a commercial cargo container or its equivalent equipped with a plurality of floating buoys. In the preferred embodiment of the present invention depicted in FIG. 1 said plurality of buoys is 2. Said buoys are provided with a floating mechanism that self adjust their level of immersion into seawater by taking in or forcing out seawater by means of a mechanical pump in order to maintain an optimal level of buoyancy as described below.

As it can be seen from the drawings the device of the present invention comprises: a container of solid copper (1), an external grid (2), a floating buoy system (3), a plurality of light bulb (4), a Global Positioning System (GPS) (5), and other elements eventually not shown in the drawings including a battery bank, electrical circuitry, and a solar panel. Within the container several plastic cases are installed containing loose iron in its solid form.

Said buoys may be constituted by metal, plastic, resins or other suitable material and may be arranged in batteries or singularly. Said buoys can be used in as single fixed location or moved over time by a vessel or an equivalent vector.

Said copper container features an internal cavity accessible to seawater. Copper Cargo containers are made of solid copper. Inside several cases of plastic are installed containing iron in its loose form. As water gets in touch with the solid iron or solid iron alloy the external surface of said iron gets oxidized to Iron trioxide, common rust. Solid Iron and or its alloy may be added in the form of a spongy mass, to maximize the surface area, or may be cables, nails, screw, laminates, solid blocks, ingots, or other geometrical form, excluding iron nanoparticles, that do not seems to be effective and require some form of control or reaction chamber.

Iron (III) commonly known as rust in not soluble in water, thus it is not available to the biota. In order to be bio-available iron needs to be in a water soluble form such as Iron II. Iron II is a lower oxidation state of Iron and it is not stable in seawater conditions of pH, pE, partial pressure of Oxygen, Temperature, and Ionic strength. These conditions are very well know in the art.

The main feature of the present invention is to provide a way to facilitate or stabilize the intermediate water soluble Iron II in the oxidation process of Iron from Iron metal (with zero oxidation state) to Iron Oxide (with oxidation state of plus three). By providing bioavailable iron to Oceanic waters that are high in nutrients and low in primary productivity a net fertilization effect is reached and aimed. Said fertilization effect stimulates in turn the algal production that is proportional to the photosynthetic activity of said waters. An increased photosynthetic activity increases the consumption of carbon dioxide and the production of oxygen, thus addressing a solution to the global warming issue.

While several embodiments are possible for the present invention we will suggest at least one preferred embodiment without departing from the scope of the disclosure, but also without limiting the best mode to said example.

In the first preferred embodiment of the present invention at least a portion of the container is made by solid Copper (0). The Iron to be dissolved as fertilizer in its solid form is in its lowest possible oxidation state that is zero (0). The control of the amount of bioavailable iron supplied to the water is obtained by forcing the pE of the surrounding waters via an electrical cell coupling the electrodic potentials of iron and copper. This first preferred embodiment is based on the "Baghdad Battery" concept where iron spontaneously oxidizes when place in contact with a more noble metal such as copper.

The container is covered with a copper/copper hydroxide grid that is also eventually electrically connected with the other reservoirs of iron spread through out the device. The difference in electro motive force (e.m.f.) between copper and iron shortcircuited via the seawater creates an electrical cell where the two following half reactions take place:

$$Cu^{+2}+2OH^-+2e^-+2H^+ => Cu+2H_2O$$

where $Cu^{+2}$ precipitate solid as hydroxide in presence of $OH^-$ yielding to a net half reaction:

$$Cu(OH)_2+2e^-+2H^+ => Cu+2H_2O$$

a parasite reaction that may take place, depending on the pE/pH conditions, is the oxidation of copper to its intermediate $Cu^+$. Ultimately in the marine environment the more stable form of $Cu^{+2}$ is thermodynamically favored. The formation of an excess of hydrogen ions is not significant in the marine environment where the long term pH is buffered by the silicic acid/silicate system. The copper/copper oxide grid then function as a cathode due to the high standard electrodic potential of Copper.

At the anode the dissolution of Iron (0) to Iron (II) or (III) is carried on via the following reactions:

$$Fe => Fe^{+2}+2e^-$$

and $$Fe => Fe^{+3}+3e^-$$

overall the constant dissolution of iron is ensured by the difference in the electrodic potential of the two metals, with the resulting production of bio-available iron.

This embodiment has the advantage over the prior art focused for example in stabilizing the pH conditions, to avoid the use of corrosive acids, such as Sulfuric Acid, or Hydrochloric acid used in previous experimentations in the Southern Ocean. This is a major break through and departure from the prior art that usually acted on chemical agents rather than on physical stabilization to make iron available to the biota.

Once the iron is released in HNLC water it has been shown that is stimulates phytoplankton blooms especially with regard to diatoms and other micro-algae whose growth is limited by the absence of this micro nutrient.

The Carbon dioxide sequestration apparatus and method object of the present invention would necessarily need to factor in the ideal locations for algae farming operations, as well as the volume of area needed to remove the target amount of carbon dioxide from the atmosphere. The device is equipped with a Global Positioning System (GPS) to track its position across marine currents and various artifacts, as shown in the drawings to allow for periodic maintenance operations, usually scheduled in 6 months periods. In one of the preferred embodiment of the present invention a battery bank is electrically connected with a Central Processing Unit (CPU), with the copper frame, with the iron barbs, and with the GPS system.

The ocean surfaces comprising areas of high nutrient, low-iron/low-algae concentration is estimated to cover approximately 20% of the earth's oceans surface area. This amounts to approximately 27,782,060 square miles potentially available for accelerated algae aquaculture operations. Once the soluble iron is released from the floating device marine currents are then utilized to spread the dissolved iron over vast areas.

Based on previous results of scientific experimental iron seeding and the resulting sudden algae blooms, the amount of carbon dioxide consumed by one square mile of surface algae is approximately 1300 tons per year. Therefore, the required surface area of algae fields needed to consume 1 billion tons of carbon dioxide from the atmosphere per year is approximately 770,000 square miles.

In exchange for that only minimal amount of Iron will be consumed due to the proportion relating iron to the ultimate consumption of Carbon Dioxide. The inventor here disclose that ascertained for the molar ratio between Iron used to Fertilize the Oceans, and the Carbon Dioxide Sequestrated as a result of said fertilization is 1 to 380,000. That means that 1 Kg of Iron is necessary to remove 380 Metric Tons of atmospheric Carbon Dioxide. Hence only 4 Kilograms of solid iron are required to effectively fertilize a square mile of ocean surface per year.

That is that there is a constant ration between different chemical components of the oceans that the inventor estimate to be 380,000 C:58,000 N:3,600 P:1 Fe. This ratio was eventually extrapolated from the European iron Fertilization Experiment I (EIFEX I). Under the light of the experimental results the inventor claims that for each kilogram of Iron made bioavailable the HNLC oceanic waters are able to sequestrate about 380,000 Kilograms of Carbon Dioxide.

The physical removal of millions of tons of carbon dioxide annually through this method will have the net effect of reducing the greenhouse effect resolving, in turn the Global Warming issue addressed in the Background section of this application. In addition to that carbon fixation in Oceanic waters will increase primary productivity and hence the availability of phytoplankton, the first ring in the oceanic food-chain.

It has been speculated that, by increasing the amount of carbon present in the world of Oceans, zooplankton, feeding on such carbon could also develop and grow faster in turn facilitating larger fishes to feed and prosper. While no experimental evidence has been collected with this regard, it is a logical consequence of the carbon fixation process to increase the mass of organic carbon available in the world of Oceans, hence the production of fish and zooplankton, such as krill. Assuming a dissolution rate of 1,000 Kg of Iron per month per container the inventor estimated that 4,560,000 Metric Tons of Carbon Dioxide can be removed from the atmosphere. Still according the inventor's estimate about 40% of this Carbon Dioxide would be sequestred in the deep oceans via various mechanisms while 60% would stimulate primary production and in turn serve as a feed for fishes and other marine species. Periodic harvest of comestible marine species is required to remove organic carbon from the oceans that could possibly lead to excessive acidification of the marine environment via decomposition. A side effect of the atmospheric Carbon Dioxide removal under the teaching of the present invention is then an increase in seafood production, whether fishes, crustacean, zoo plankton, or other comestible species.

First Preferred Embodiment

In its first preferred embodiment the device of the present invention teaches an apparatus for the dissolution and spreading of a constant supply of ferrous Iron in oceanic waters comprising: a perforated copper frame, a floating system, an internal plastic container, or as an alternative a plurality of plastic containers, a plurality of iron wires, a battery bank, a CPU, a GPS, a plurality of light bulbs, and a plurality of electrical circuitry electrically connecting said battery bank to said CPU, GPS, said light bulbs, said copper frame, and said iron wires.

In this preferred embodiment the oxidation of Iron from Iron (0) to Iron (II) is driven by the reduction of the Copper at the Cathode. Further, the use of the metals used as cathodes is not limited to cooper since this invention might cover different metals with similar properties and fulfill the cathode function. Other metals, or materials in general having an electrodic potential higher than Iron can be used as cathode. Materials and metals, generally speaking electroactive species, having electrodic potential higher than the Iron(0)/Iron (II) system include: Permanganate, Gold, Platinum, Silver, Copper, Cobalt, Halogens in general and their oxo-compounds, Chalcogens (VI group elements) in general including oxygen, Nitrates, and other common systems.

The main disadvantage of this first embodiment is the inability of controlling and monitoring the anodic potential. In a separate embodiment said apparatus has a CPU that controls the difference in electrodic potential imposed by said battery bank respectively to said perforated copper frame, and to said iron wires eventually to adapt the local electrodic potential to maximize the dissolution of Iron (II) into seawater. As a matter of example the difference in electrodic potential imposed by said battery bank respectively to said perforated copper frame, and to said iron wires to be set at around 6 Volts.

In a separate preferred embodiment of the instant device the apparatus of claim one where said floating system has variable assets (configurations) that means that the side floaters (3) can be adjusted to allow a variable portion of the copper structure to be submerged by seawater. The first CPU disclosed in this first embodiment basically controls the operation of the floating device by controlling the operations of the GPS system, the illumination system (light bulbs), and the variable configuration floating system.

The inventive device of the instant invention is powered by a power source such as an electrical generator, or a solar panel electrically connected to said battery bank, or a combination of both.

The instant invention furtherly teaches a method for removing carbon dioxide from the atmosphere comprising the steps of: selecting a HNLC water patch, transporting the inventive device of claim one to that patch, applying an electrodic potential between said perforated copper frame and said iron wire sufficient to cause the dissolution or the iron, as ferrous iron in seawater, spreading soluble ferrous iron in the patch for a set period of time, allowing for phytoplankton to grow and develop, incorporating atmospheric carbon dioxide, allowing for phytoplankton to be scavenged, and ultimately sink to the bottom of the ocean.

Second Preferred Embodiment

Figure 2:
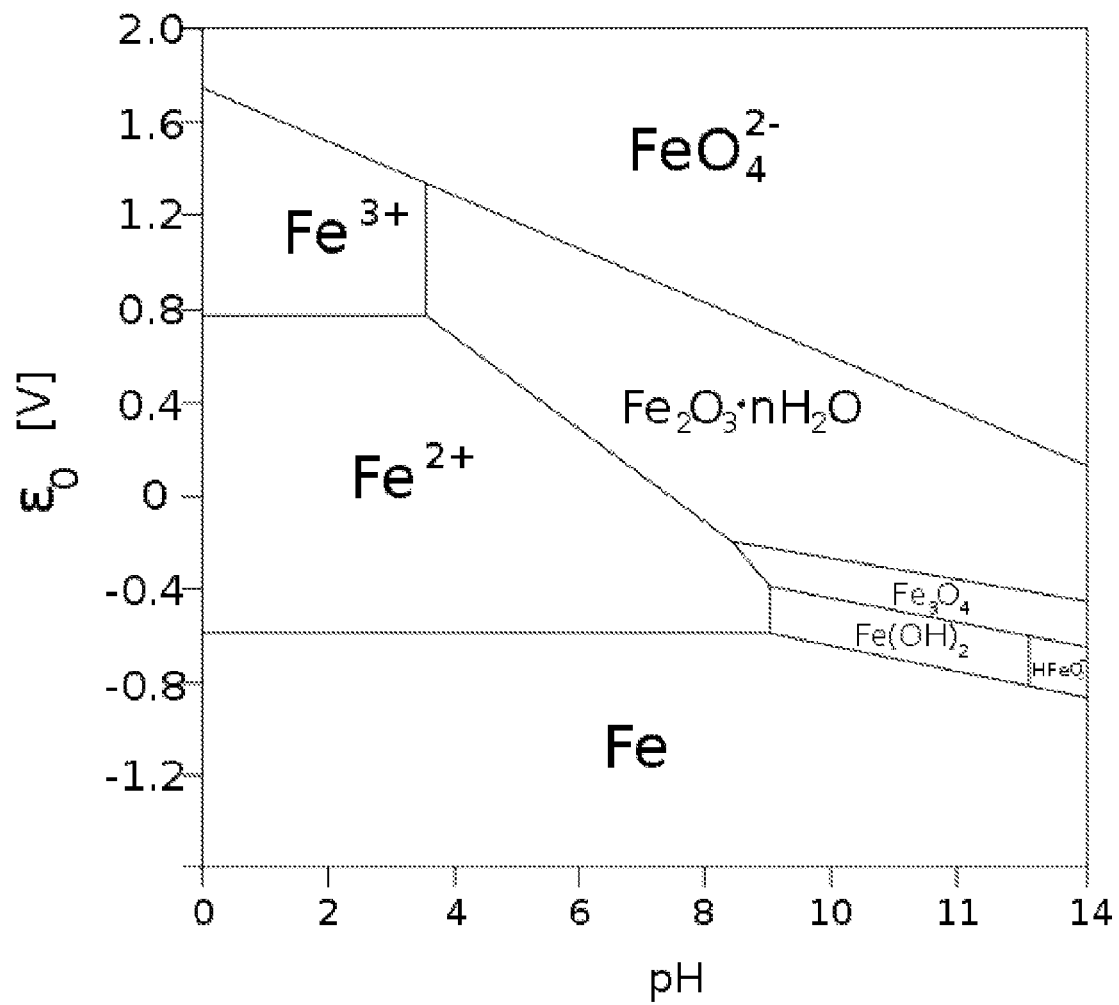
FIG. 2 is a generally accepted Pourtbaix diagram for the Iron system showing the field of stability of Ferrous Iron.

One of the main differences between the device of the present application and the prior art devices is that the device of the instant invention controls the dissolution of iron in water via an electrochemical process due to the difference between the electrodic potential of copper and iron mediated by a battery bank. In a second preferred embodiment of the device of the present application the proper electrodic potential at the iron site is maintained by means of a controller. FIG. 2 shows the Purbaix's diagram for the Iron system. As shown the stability of Iron (II) or bioavailable Iron is enclosed in a very specific range of pH and pE.

In the specific at values of pH=8 (the generally accepted pH of seawater) the eletrodic potential at which Iron (II) is stable is around −0.4 V. Thus by applying an electric tension of −0.4 V to the iron electrode favors the dissolution of iron into bioavailable Iron (II). In the first preferred embodiment of the present invention the Iron dissolves in water via a REDOX reaction favored by the electric contact with copper. Various factor, such as passivation, encrustation either natural or inorganic, the formation of films (including biofilms), parasite currents, may affect the rate of dissolution of the iron as iron (II) in seawater. In this second preferred embodiment of the present invention a tension controller, shown in FIG. 3, is in fact installed between the battery bank and the iron wires to maintain the electrodic potential constant around −0.4.

Figure 3:
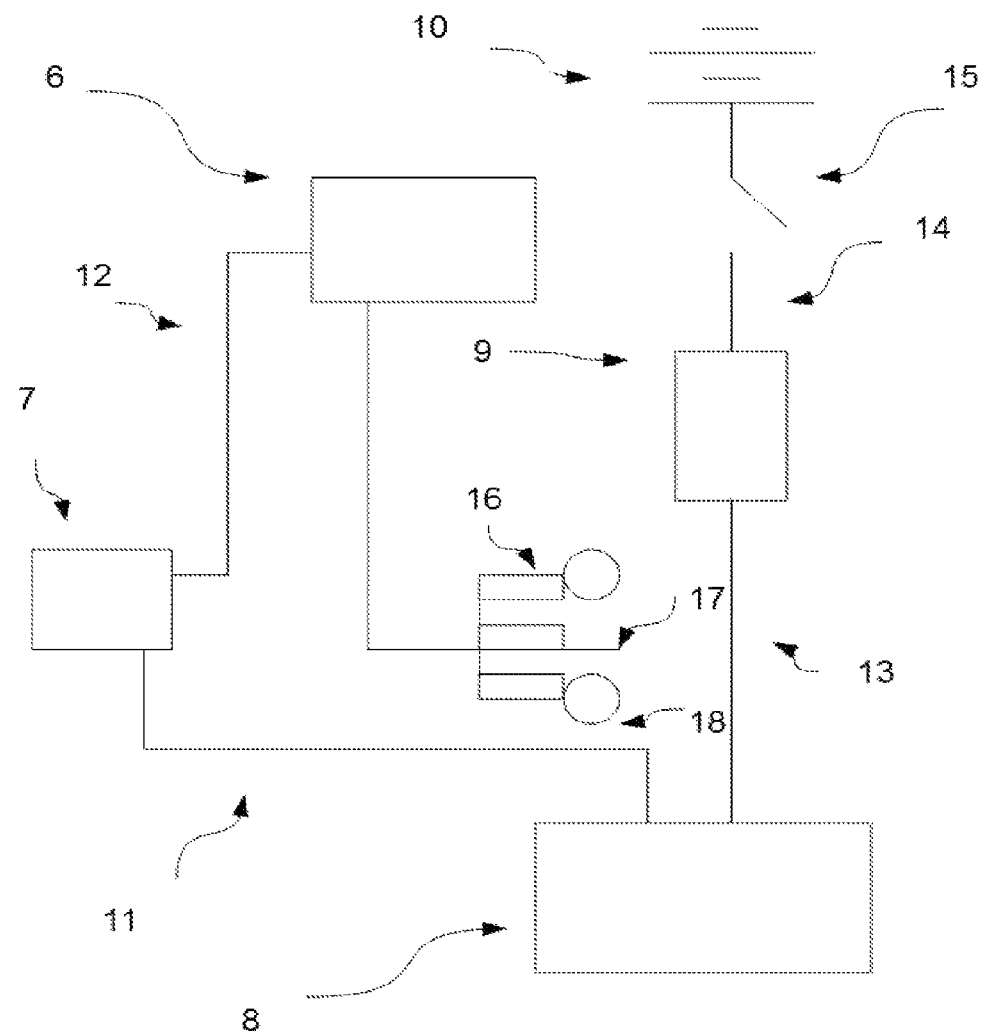
FIG. 3 is a diagrammatic representation of the tension controller of the second preferred embodiment of the present application.

With reference now to FIG. 3 it is possible to see a diagrammatic illustration of the tension controller including a tension controlling CPU (6), A Voltmeter (7) connected to a source of iron (8), a rheostat (9), and a battery bank (10), a plurality of electrical circuitries (11, 12, 13, and 14) and a switch (15). The CPU operates to adjust and maintain the electrodic potential at the iron source within the stability field of Iron (II) as a function of the pH as described in FIG. 2. The Voltmeter detects the electrodic potential at the Iron and relates the data to the CPU via electrical circuitry (11).

In this second preferred embodiment the cathodic half reaction takes place internally in the battery bank, while the anodic half reaction, represented by the dissolution of solid Iron into Iron (II) takes place at the interface with the seawater. The CPU is set to keep the anodic potential within the range of stability of Iron (II) as a function of pH and temperature. A pH meter (16), a temperature sensor (17), and a dissolved oxygen sensor (18) may provide complementary information for the CPU to calculate the anodic potential that favors the dissolution of solid Iron into Iron (II). The main component of this tension controller is the Voltmeter. When the Voltmeter (7) detect a change in electrodic potential outside the field of stability of Iron (II) as function of pH and Temperature, it control the rheostat to deliver a higher (or lower) tension to the anode so that it can be brought within the range of stability of the Iron (II).

High energy long lasting batteries are needed for the battery bank able to perform in the most extreme conditions of pressure, temperature, and humidity. An electrical battery is one or more electrochemical cells that convert stored chemical energy into electrical energy. There are two types of batteries currently available in the stream of commerce: primary batteries (disposable batteries), which are designed to be used once and discarded, and secondary batteries (rechargeable batteries). For the purpose of assembling the device of the present application Absorbed Glass Math (AGM) batteries, are the first choice, but Li-ion (Lithium Ion) batteries, Gel batteries, Nickel-Cadmium batteries, Nickel-Zinc batteries, Nickel-Metal Hydrate batteries, Lead-Acid batteries, and their subset of valve regulated lead acid battery (VRLA) are also a possible option.

The CPU mediates or regulates the differences in electrodic potential between the copper and the iron barbs so to keep the optimal potential to keep the dissolution of Iron (o) into Iron (II) constant over time. While the difference in potential between the various form of copper and iron in its different oxidation states can be theoretically calculated in the fashion shown above, variations in marine's water pH, composition, and temperature may affect the local dissolution rate of the iron. To control the Iron's dissolution rate a CPU controls the difference in potential between the copper structure (frame) and the iron wires.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An apparatus for the dissolution and spreading of a constant supply of ferrous Iron in oceanic waters comprising a floating buoys system upon which is mounted an apparatus comprising:
   A) a tension controlling CPU, electrically connected to a Voltmeter that in turn is connected to a plurality of iron wires contained in a plurality of plastic cases via an electrical circuitry; and
   B) a rheostat, controlled by said CPU, inserted into said electrical circuitry in between a battery bank and said iron wires.

2. An apparatus for the dissolution and spreading of a constant supply of ferrous Iron in oceanic waters comprising a floating buoys system upon which is mounted an apparatus comprising:
   A) a tension controlling CPU, electrically connected to a Voltmeter that in turn is connected to a plurality of iron wires contained in a plurality of plastic cases via an electrical circuitry; and
   B) a rheostat, controlled by said CPU, inserted into said electrical circuitry in between a container of solid copper and said iron wires.

* * * * *